United States Patent [19]

Kara

[11] 4,141,053
[45] Feb. 20, 1979

[54] MAGNETIC TAPE HEAD CLEANING APPARATUS

[76] Inventor: Stephen Kara, 2609 Sapra St., Thousand Oaks, Calif. 91360

[21] Appl. No.: 816,352

[22] Filed: Jul. 18, 1977

[51] Int. Cl.² .............................................. G11B 5/41
[52] U.S. Cl. .................................... 360/128; 360/137; 15/97 R
[58] Field of Search .................. 15/97 R, 210 R, 246; 360/128, 137

[56] References Cited

U.S. PATENT DOCUMENTS

| 3,439,922 | 4/1969 | Howard | 360/137 |
| 3,655,924 | 4/1972 | Puskas | 360/137 X |
| 3,761,994 | 10/1973 | Becht | 15/210 R |
| 3,955,214 | 5/1976 | Post et al. | 360/128 |

*Primary Examiner*—Daniel Blum

[57] ABSTRACT

The present invention is a device used to clean the magnetic tape head of a magnetic taped recording/playback unit incorporating the use of cassette mounted magnetic tapes. A housing of substantially the same shape and size of a magnetic tape cassette is adapted to be inserted within the cassette receiving aperture of the magnetic tape playback/recording unit. A pair of spring biased arms are independently and rotatably coupled about one of the cassette hubs. The disposition of the tape head and the capstan roller of the playback/recording unit causes the capstan drive to initiate rotation of a coupled gear train linking the independently rotatable arms. The surface used to clean the magnetic tape head is coupled to a planar transfer gear which rotates as a result of the capstan drive, the spring biased arm maintaining pressure against the magnetic tape head while the housing holding the cleaning apparatus is maintained within the playback/recording unit.

9 Claims, 5 Drawing Figures

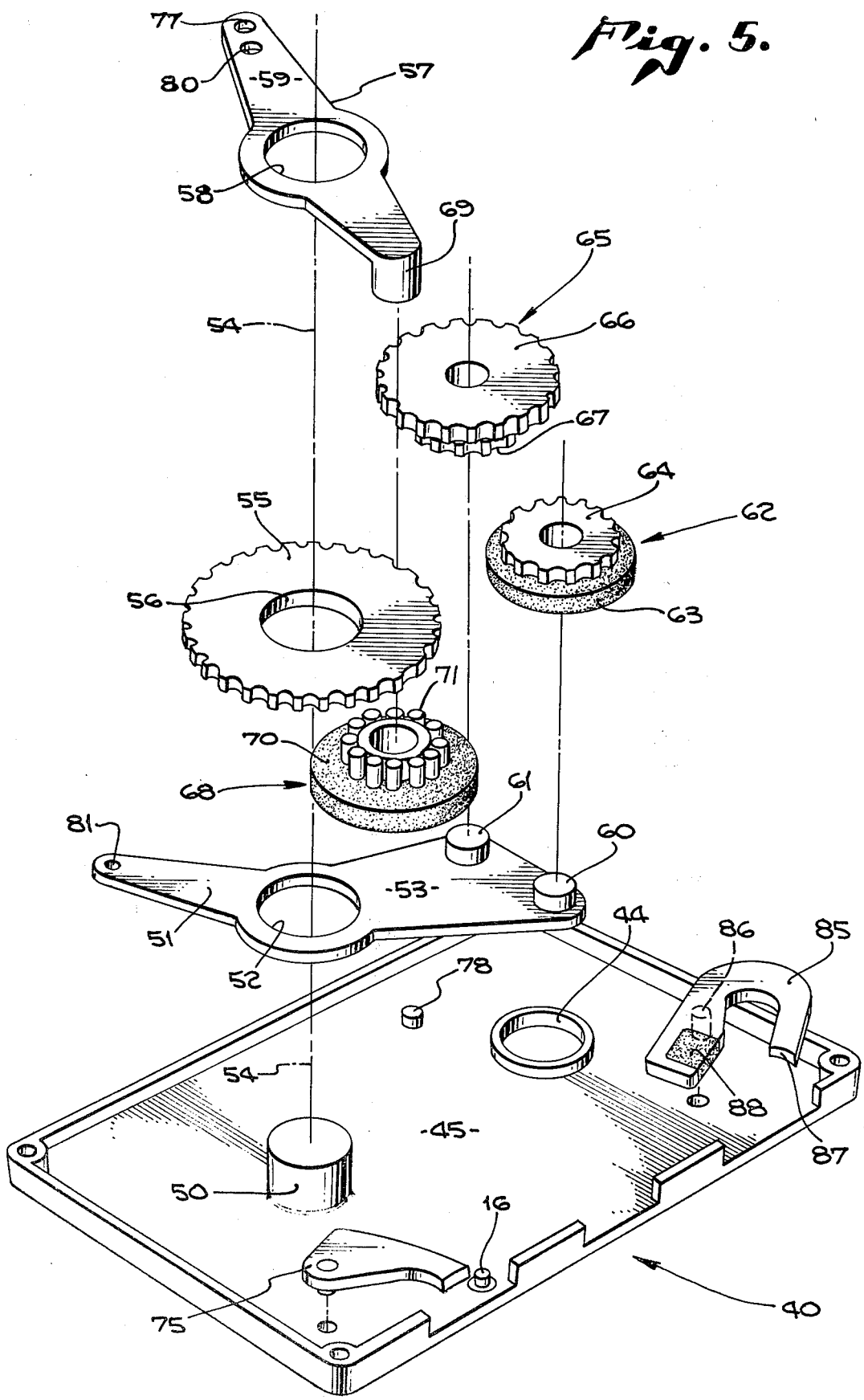

MAGNETIC TAPE HEAD CLEANING APPARATUS

BACKGROUND OF THE INVENTION

1. Field of the Invention

The present invention magnetic tape head cleaning apparatus is generally within the field of cleaning equipment, but more particularly that cleaning equipment adapted to be used for cleaning magnetic tape heads.

2. Prior Art

The increased use of magnetic tape as a source for entertainment and other purposes has produced the need for more efficient ways to maintain the equipment. The casette tape playback/recording units being used within automobiles and for other uses have several characteristics in common. The units which utilize cassette mounted tapes use a standardized cassette package. In addition, the cassette is inserted within an aperture or within a fully covered receiving area in the playback-/recording unit which prevents direct access to the magnetic tape head or the capstan and pinch roller used for providing the motive force to the tape.

It has long been recognized that continued use of the playback/recording unit will result in accumulation of dirt or other debris at the magnetic tape head, erase head, capstan and pinch roller. The accumulation of dirt or other debris will result in degraded reproduction from or recording of the magnetic tape because of interference at the head gap potentially resulting in total failure of the playback/recording unit.

The difficulty in gaining access to the magnetic tape head has lead to the development of devices which are disclosed by the prior art, none of which satisfactorily solve all of the inherent problems. One of the devices disclosed by the prior art uses a tape cartridge having an abrasive material mounted in place of the tape. The cleaning action of the magnetic tape heads is mechanical in nature and is intended to abrasively rub all dirt or debris from the fact of the magnetic tape head. The problem with this type of device is apparent. The magnetic tape head is a sensitive component made of small subcomponents, the action of contacting the surface of the magnetic tape head with an abrasive tape will eventually result in damage and possible destruction of the magnetic tape head.

Another device disclosed by the prior art incorporates a mounted felt strip within a magnetic tape cassette. The felt strip is urged through the cassette in the same manner as magnetic tape. The device is intended to clean the magnetic tape head by impregnating the felt strip with isopropyl alcohol or other like cleaning fluid and allows the movement of the felt strip across the magnetic tape head to clean dirt and other debris from the magnetic tape head. Several problems remain unsolved through the use of this device. Since the felt is mounted within the tape cassette to move therethrough in a manner analogous to tape, there is a substantial volume of felt material. This will result in substantially diffusing the cleaning fluid throughout the felt. The result is the very weak concentration of the cleaning fluid at the point of contact with the magnetic head thereby minimizing the cleaning effect of the device. Another problem results in the inability to apply sufficient pressure on the tape head to carry out the cleaning function. Since the felt strip is mounted in a manner analogous to magnetic tape, pressure cannot be asserted against the strip to force it against the magnetic head since this would in effect stop the rotation of the capstan or otherwise halt the movement of the strip through the cassette. Since this type of device requires movement of the fluid impregnated strip, halting the movement of the tape obviously precludes any cleaning upon the magnetic tape.

Another device disclosed by the prior art is designated as U.S. Pat. No. 3,761,994. This patent discloses a spring biased cleaning apparatus which is to be used for magnetic tape cartridges. The inability to utilize a structure such as this is evident. An arm disposed from the front to the rear wall of the cartridge, lateral movement of the cleaning pads across the magnetic tape head being accomplished through the use of a mannual handle. The inadequacies of this device as it is applied to magnetic tape cassettes is evident. Since cassette playback/recording units include an internal, covered compartment within which to dispose the magnetic tape cassette during operation, the movement of the cleaning member must be self-contained since no access to the internal members of the cassette is possible.

The present invention substantially solves those problems which have left unresolved by the devices disclosed in the prior art. Although the industry has attempted to maintain strict standards with respect to magnetic tape playback/recording units, it is well known that there is a variation of commercially available units, e.g., whether they are provided with or without tape guides. The positioning of tape guides can render many of the devices disclosed by the prior art useless for the intended purposes. In addition, any variation in the placement of the magnetic tape head capstan roller and device can also lead to inoperability of a cleaning device. The present invention utilizes a pair of independently rotatable arms which are positioned about a cassette hub. The arms are resiliently biased. A first arm is engaged against the capstan drive upon insertion of the cleaner housing. The spring biasing member will maintain appropriate pressure between the capstan drive and the coupling unit irrespective of slight variations in the placement of the capstan drive and roller. Rotation of the capstan drive is transmitted through a gear train to members affixed to the second spring biased arm. When the housing is inserted within the cassette receiving aperture of the playback/recording unit, the spring biasing member affixed to the second arm will maintain pressure between the cleaning surface which is coupled to the second arm against the face of the magnetic tape head. The magnetic tape head will be subjected to sufficient cleaning motion irrespective of minor variations in the placement of the capstan roller and drive and the present or absence of the tape guide.

SUMMARY OF THE INVENTION

The present invention comprises an apparatus for providing means to clean the magnetic tape head assembly of a playback/recording unit adapted for mounting tape cassettes. It is to be noted that the present invention can be adapted for cleaning the magnetic tape heads of eight-track cartridge transports, but for the purpose of example, cassette equipment shall be discussed. The need for cleaning the magnetic tape head arises out of the structure of the magnetic tape head itself. The magnetic tape head assembly involved typically comprises separate heads for the particular number of recorded tracks of the tape being used. Each magnetic head is typically constructed of two identical core halves built of thin laminations of magnetic alloy material. Each half is then wound precisely with an identical number of turns and assembled with non-magnetic separators at the front and rear with a miniscule gap remaining at the bottom of the head which contacts the magnetic tape. As the tape transport draws the tape across the head, the gap between the core halves is shunted, and the magnetic flux path is completed. The head gap is critical in both the recording and reproduction phase of the process. When recorded tape is drawn across the gap of the head, the portion of the tape in actual contact with the gap bridges the magnetic core of the head causing magnetic flux to flow through the core. The head gap size depends on the intended function of the head. For a record head, it must be wide enough to permit the flux to penetrate the tape deeply, yet narrow enough to obtain sharp gradients of flux. For a reproduction head, gap size must be a compromise between the upper-frequency limit, dynamic range and head life. Extremely close mechanical tolerances are inherent in the head gap as well as the flux position of the tape and magnetic head. If dirt or other depris lodges on the surface of the magnetic tape head or within the head gap, the strength of the magnetic flux will be deleteriously affected. Therefore, in order to maintain proper operating conditions, the magnetic tape head must be cleaned to remove any dirt or debris which accumulates. These conditions will occur from the scraping effect which exists as the top oxide layer passes over the tape head. The oxide build-up and dirt and debris physically disposed on the magnetic tape are all contributing factors to reduced tape head operation.

Tape transports utilizing cassette mounted magnetic tape present a different problem with regard to cleaning the magnetic tape head assembly. Magnetic tape cassettes are generally mounted with apertures which substantially preclude access to the magnetic tape heads or are mounted within compartments which preclude any access to any of the lateral edges of the cassette. Since the magnetic tape head is virtually inaccessible, the need for the present invention has arisen. A housing having substantially the same shape as a magnetic tape cassette provides for mounting the cleaning apparatus. A cassette housing is utilized to provide the supporting structure for the present invention magnetic tape head cleaning apparatus. A shaft is mounted within the aperture usually utilized by the cassette hub which is substantially adjacent the playback/recording unit capstan drive. A pair of independently reciprocally rotating members are mounted upon the shaft, each being resiliently coupled with respect to a fixed point within the housing. A rotatable transfer roller is journeled at an end of the first member and is adapted to contact the capstan drive when the housing is inserted within the recording/playback unit. The rotation of the capstan drive is transferred to the transfer roller which is in turn coupled to a planar transfer gear rotatably mounted upon the shaft. The transfer gear is meshed with one section of a double-tiered gear which is rotatably mounted to the second spring biased member. The rotation of the double-tiered gear is transferred to the cleaning surface through the use of a coupling gear which is secured to the cleaning surface. The coupling gear and attached coupling surface are also affixed to the second spring biased member.

When the present invention magnetic tape head cleaning apparatus is inserted within the recording/playback unit, the position of the capstan roller causes rotation of the first spring biased member to place the transfer roller against the capstan drive. At the same time, the positioning of the cleaning surface against the magnetic head will cause the second spring biased member to go into a tensioned state to maintain pressure against the magnetic tape head. When operating, the present invention magnetic tape head cleaning apparatus can appropriately adapt to variations in the placement of capstan drive and roller and will maintain appropriate pressure against magnetic tape head to insure a proper cleaning motion irrespective of whether the recording/playback unit utilizes a tape guide. The spring biasing of the members mounted upon the shaft will insure appropriate cleaning of the magnetic tape head under substantially all conditions.

It is therefore an object of the present invention to provide an improved magnetic tape head cleaning apparatus.

It is another object of the present invention to provide a non-abrasive magnetic tape head cleaning apparatus.

It is still another object of the present invention to provide an improved magnetic tape head cleaning apparatus mounted within a tape cassette.

It is still yet another object of the present invention to provide a magnetic tape head cleaning apparatus incorporating means for cleaning the capstan of the magnetic tape transport.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 5 is an assembly view of the elements of the present invention magnetic tape head cleaning apparatus.

DESCRIPTION OF THE PRESENTLY PREFERRED EMBODIMENT

Figure 1:
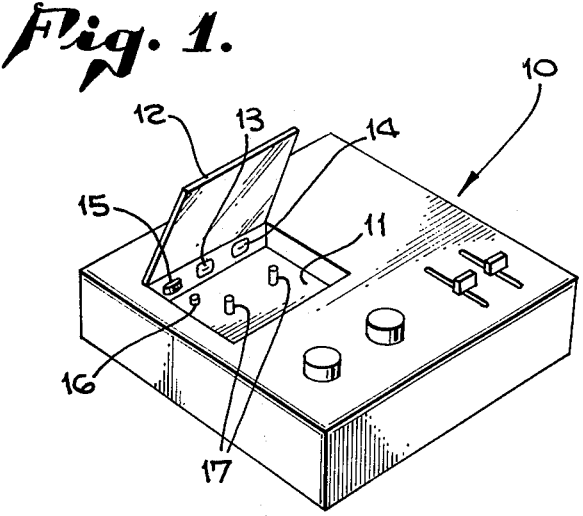
FIG. 1 is a front perspective view of one form of a magnetic tape transport adapted for using cassette mounted magnetic tapes.

An understandng of the use of the present invention magnetic tape head cleaning apparatus can be best gained by reference to FIG. 1 wherein an exemplary magnetic tape cassette recording/playback transport unit is shown, the transport unit being generally designated by the reference numeral 10. Magnetic tape transport unit 10 is typically a reproduction unit adapted to receive magnetic tape cassettes. Transport unit 10 employs an internal compartment 11 accessible by cover 12. A tape cassette is placed within compartment 11 during operation of transport unit 10. As illustrated, magnetic tape head 13, erase head 14, capstan pinch roller 15 and capstan drive 16 can be seen. When a cassette unit is disposed within compartment 11 and cover 12 moves into position, none of the lateral edges of the tape cassette will be accessible. As shown in FIG. 1, the cassette will be disposed upon hub drive 17, but the tape cassette itself will be essentially inaccessible. It is to be understood that the form of the transport unit 10 shown in FIG. 1 is for the purpose of example only. The present invention magnetic tape head cleaning apparatus will function properly in all conventional transport units which utilize cassette mounted tape.

Figure 2:
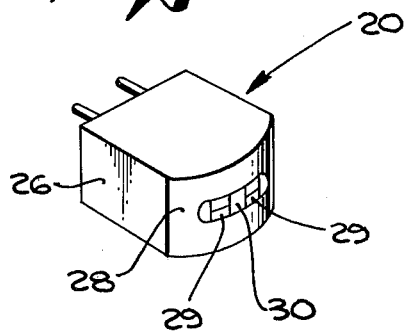
FIG. 2 is a front perspective view of an exemplary magnetic tape head to be cleaned in accordance with the present invention.

For the purpose of example, the magnetic tape transport unit 10 shown in FIG. 1 will be used to explain the present invention. The preferred form of the magnetic tape head cleaning apparatus is disposed within compartment 11 of the transport unit 10 in substantially the same manner as the magnetic tape cassette which is intended for use within transport unit 10. The structure of magnetic tape head cleaning apparatus will be described in detail below. An understanding of the need for the present invention magnetic tape head cleaning apparatus can be best gained by reference to FIG. 2 wherein an exemplary magnetic tape head assembly is shown, the assembly being generally designated by the reference numeral 20. Magnetic head assembly 20 comprises an outer housing 26 having a convex profile 28 adequate for interface with the magnetic tape disposed within a suitable cassette. In the case of head assembly 20 as shown in FIG. 2, head assembly 20 comprises a 2-track magnetic head. Magnetic head assembly 20 consists of two magnetic heads 29, each made up of a pair of core halves typically built of thin laminations of alloy materials. One pair of heads is necessary since the magnetic tape stored within a cassette is recorded by placing two recorded tracks on each half of the tape. Each core half is precisely wound with a predetermined number of turns and assembled with non-magnetic separators at the front and rear of the head with a small gap 30 separating the core halves. The spacing between magnetic heads 29 becomes important to eliminate cross-talk between tracks.

In operation, when magnetic tape is drawn across gap 30, the portion of tape in actual contact with the gap bridges the gap between the magnetic core halves causing magnetic flux to flow through the core. As transport 10 draws the tape across surface 28 of head assembly 20, gap 30 is shunted and the flux path through each of the magnetic heads 29 is completed. If dirt or other debris should lodge in gap 30 or cause a shunted medium to exist between adjacent tracks, the performance of magnetic head assembly 20 and therefore transport 10 would be seriously degraded. It therefore becomes obvious that means must be provided to effectively remove any dirt or debris which may become lodged between any pair of core halves of a magnetic head 29 or between adjacent tracks.

Figure 3:
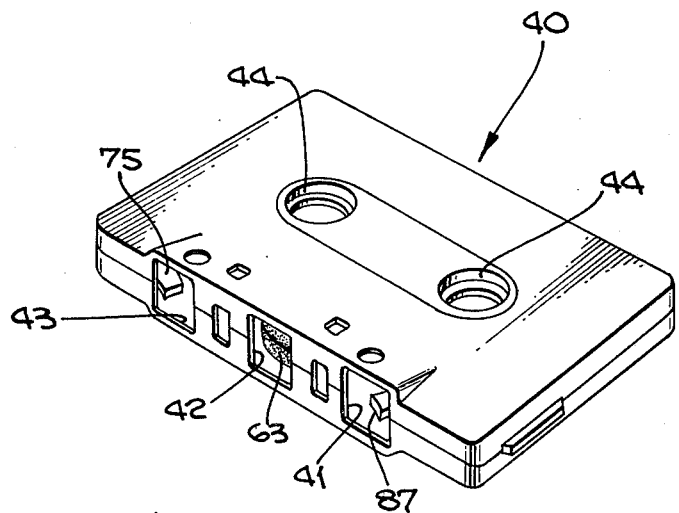
FIG. 3 is a front perspective view of the present invention cassette tape head cleaner illustrating the quiescent position of the cleaning portion of the present invention.
Figure 4:
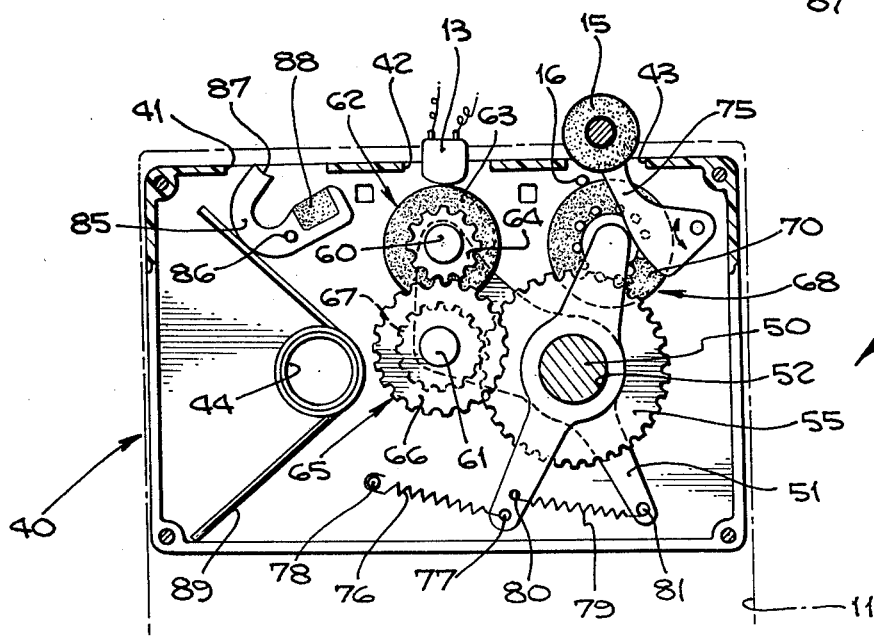
FIG. 4 is a top plan view of the interior of the present invention magnetic tape head cleaning apparatus shown in engagement with an exemplary recording/playback unit.

An understanding of a preferred embodiment of the present invention magnetic tape head cleaning apparatus can be best gained by reference to FIGS. 3, 4 and 5. The present invention magnetic tape head cleaning apparatus comprises an outer housing 40 which is structurely similar to the magnetic tape cassettes used with transport 10 (FIG. 1). The front wall of housing 40 has three apertures 41, 42 and 43 to interface with the structural assembly of transport 10. Aperture 43 will receive the capstan pinch roller of transport 10, this to be explained in detail below. Aperture 42 at the center of housing 40 will be in cooperative relationship with the magnetic head assembly of transport 10. Aperture 41 in the front surface of cassette 40 will lie adjacent and be adapted to admit the erase head 14. Drive hubs 44 are adapted to be disposed about the shafts 17 of transport 10.

Shaft 50 is secured within the position of drive hub 44 and is disposed perpendicular to bottom wall 45 intermediate the two half-shells making up housing 40. Shaft 50 is secured intermediate the half-shells of housing 40. The elements of the present invention magnetic tape head cleaning apparatus are assembled in the manner shown in FIG. 5. First spring biased member 51 includes aperture 52 which is adapted to be disposed about shaft 50 in a manner which will permit member 51 to oscillate about shaft 50 and maintain a perpendicular relationship between base 53 thereof and the axis 54 of shaft 50. Planar transfer gear 55 includes a concentric aperture 56 which is aligned with aperture 52 and disposed about shaft 50. Second spring biased member 57 includes aperture 58 which is adapted to be disposed about shaft 50 in a manner to maintain a perpendicular relationship between the base 59 of second spring biased member 57 and axis 54 of shaft 50. As can be best seen in FIG. 5, first spring biased member 51, planar transfer gear 55 and second spring biased member 57 are disposed upon shaft 50 in that order, each of the three members being rotatably independent of one another.

The base 53 of first spring biased member 51 includes first and second upwardly extending shafts 60 and 61 which are substantially in line with aperture 42 at the center of housing 40. Head cleaning wheel 62 is rotatably disposed upon shaft 60 in the manner shown in FIG. 5. Head cleaning wheel 62 is comprised of upper and lower tiers, the lower tier being the cleaning element 63, cleaning element 63 being a non-abrasive material such as a felt ring. Gear 64 is secured to cleaning element 63 and lies in axial abuttment therewith. Head cleaning wheel 62 is rotatably mounted about shaft 60. Double-tiered gear 65 is rotatably mounted about shaft 61. Double-tiered gear 65 includes upper and lower gears 66 and 67 respectively. Gear 66 is adapted to mesh with gear 64, cleaning element 63 being in a planar relationship but separated from the surface of lower gear 67.

When double-tiered gear 65 is in place, the geared surface of lower gear 67 will be engaged with the geared surface of planar transfer gear 55. As stated previously, planar transfer gear 55 will freely rotate about shaft 50. When rotational force is applied to planar transfer gear 55, the rotational motion thereof will be transferred through double-tiered gear 65 to head cleaning wheel 62.

In order to initiate operation of the present invention, transfer roller 68 is rotatably mounted upon downwardly depending shaft 69. As can be best shown in FIG. 5, shaft 69 depends from a terminus of second spring biased member 57, shaft 69 being substantially adjacent aperture 43 of housing 40. Transfer roller 68 comprises rubber roller 70 which is adapted to frictionally contact capstan drive 16 (FIG. 1). The planar surface of roller 70 will be parallel to transfer gear 55. Circular gear surface 71 is secured to and in axial abuttment with roller 70, geared surface 71 being adapted to engage the geared surface of transfer unit 55. As can be best seen in FIG. 4, rotation of roller 68 will cause simultaneous rotation of planar transfer gear 55, double-tiered gear 65 and head cleaning wheel 62.

In order to engage the structure of the present invention to magnetic tape transport 10, swingable pivot arm 75 is coupled to bottom surface 45 of housing 40. Pivot arm 75 is adapted to contact the surface of capstan roller 15. The contact between capstan roller 15 and pivot arm 75 will cause pivot arm 75 to bear against second spring biased member 57 substantially adjacent shaft 69. The force of pivot arm 75 against second spring biased member 57 will cause spring biased member 57 to rotate counterclockwise (FIG. 4) thereby placing resilient member 76 in a state of tension. As can be seen from FIG. 4, resilient member 76 is disposed between aperture 77 in spring biased member 57 and projection 78 extending upwardly from bottom wall 45 of housing 40. When housing 40 is inserted within transport 10, capstan roller 15 is urged against pivot arm 75 causing spring biased member 57 to rotate counterclockwise. The counterclockwise rotation of spring biased member 57 will cause rubber roller 70 to be urged against capstan drive 16. Simultaneously, the rotating cleaning surface 63 will contact magnetic tape head 13 first spring biased member 51 to rotate counterclockwise. The rotation of spring biased member 51 with respect to the position of spring biased member 57 will cause resilient member 79 to be put into a state of tension. As can be best seen in FIG. 4, resilient member 79 is disposed between apertures 80 and 81 in members 57 and 51 respectively. Once the present invention magnetic tape head cleaning apparatus is in place, the tension in resilient member 79 will maintain appropriate contact between cleaning surface 63 and magnetic tape head 13. Although resilient members 76 and 79 can be conventional members utilized to exert tension between elements, resilient members 76 and 79 are preferably helical springs.

As stated previously, capstan drive 16 will commence rotation upon the insertion of housing 40. The rotation of capstan drive 16 will be transmitted through transfer roller 68, planar transfer gear 55, double-tiered gear 65 to head cleaning wheel 62. Since spring biased members 51 and 57 can move independent of one another as well as planar transfer gear 55, the ability to maintain appropriate pressure between the rotating cleaning surface 63 and magnetic tape head 13 is assured irrespective of variations in the positioning of magnetic tape head 13 or capstan roller 15 and capstan drive 16.

During the operation of conventional transport units such as those designated by the reference numeral 10, capstan drive 16 can pick up dirt or other debris as a result of its contact with magnetic tape. As can be best seen by reference to FIG. 4, cleaning arm 85 is pivotally disposed about shaft 86 which projects upwardly from bottom wall 45 of housing 40. Cleaning arm 85 has a front surface 87 which is adapted to bear against capstan roller 15 when cassette housing 40 is inserted for the purpose of cleaning capstan drive 16, i.e., inverted. When the housing 40 is inserted, the capstan roller 15 will bear against surface 87 causing cleaning pad 88 to bear against capstan drive 16. When capstan drive 16 is started, its rotation against cleaning pad 88 will provide the ability to clean same. In a form of the present invention, resilient member 89 bears against cleaning arm 85 to provide for the necessary force between cleaning pad 88 and capstan drive 16.

The present invention magnetic tape head cleaning apparatus provides improved means for cleaning the magnetic tape head and capstan drive of a conventional recording/playback unit which utilizes cassette mounted magnetic tape. Irrespective of whether the transport unit utilizes a tape guide or has minor variations in the placement of the capstan roller and drive, the present invention cleaning apparatus can operate effectively.

I claim:

1. A magnetic tape head cleaning apparatus for cleaning the magnetic tape head of a magnetic tape transport having a capstan roller and drive comprising:
   (a) a housing having front and lower walls and at least two apertures through said front wall adapted to be adjacent the magnetic tape head and the capstan roller;
   (b) a shaft fixed to said lower wall perpendicular thereto;
   (c) first and second spring biased members journaled about said shaft, said first and second spring biased members being pivotal about said shaft independent of one another;
   (d) input means for coupling the capstan drive of the magnetic tape transport to said cleaning apparatus, said input means being coupled to said first spring biased member, a swingable pivot arm positioned adjacent one of said apertures pivotally coupled to the lower wall of said housing, said pivot arm being adapted to be urged against said first spring biased member when in contact with the capstan roller to urge the input means against the capstan drive,
   (e) a head cleaning wheel positioned adjacent the other of said apertures adapted to clean the magnetic tape head, said head cleaning wheel being rotatably mounted on said second spring biased member; and
   (f) means for coupling said input means to said head cleaning wheel to drive the latter.

2. A magnetic tape head cleaning apparatus as defined in claim 1 wherein said means for coupling said input means to said head cleaning wheel comprises:
   (a) a planar transfer gear rotatably coupled about said shaft intermediate said first and second spring biased members and being rotatable independent of said first and second spring biased members;
   (b) a double-tiered gear rotatably mounted upon said second spring biased member and comprising a first gear adapted to engage said planar transfer gear and a second gear which is parallel to and in axial abutment with said first gear; and
   (c) a circular member secured to and in axial abutment with said head cleaning wheel, said circular geared member being engaged with the second gear of said double-tiered gear.

3. A magnetic tape head cleaning apparatus as defined in claim 1 including a first resilient member coupled to the lower wall of said housing and said first spring biased member and a second resilient member coupled to said first and second spring biased members.

4. A magnetic tape head cleaning apparatus as defined in claim 1 wherein said housing includes a third aperture in the front wall thereof, and further including a capstan drive cleaning member comprising first and second sections lying on opposite sides of a shaft projecting upwardly from the lower wall of said housing, said capstan drive cleaning member being rotatably coupled about said shaft, a first surface of said first section being adapted to contact the capstan roller, a cleaning surface disposed upon said second section, said cleaning surface being urged against the capstan drive when the first surface is in contact with capstan roller, and including resilient means for providing a spring biased force, said resilient means coupled to the first section of said capstan drive cleaning member whereby the first surface of the first section of the capstan drive cleaning member is urged against the capstan roller.

5. A magnetic tape head cleaning apparatus as defined in claim 1 said pivot arm having a first surface projecting through an aperture in the front wall of said housing adapted to contact said capstan roller, and a second surface adjacent said first srping biased member whereby contact between the capstan roller and the first surface pivots said pivot arm, the second surface thereof bearing against said first spring biased member whereby said input means frictionally engages the capstan drive.

6. A magnetic tape head cleaning apparatus for cleaning the magnetic tape head of a magnetic tape transport having a capstan roller and capstan drive comprising:
 (a) a housing having front and lower walls and three uniformly positioned apertures through said front wall;
 (b) a shaft coupled to said lower wall perpendicular thereto;
 (c) first and second spring biased members journaled about said shaft, said first and second spring biased members being rotatable about said shaft and independent of one another;
 (d) a planar transfer gear disposed about said shaft intermediate said first and second spring biased members, said planar transfer gear being rotatable about said shaft independent of said first and second spring biased members;
 (e) input means for coupling the capstan drive of the magnetic tape transport to said cleaning apparatus, said input means being rotatably coupled to a portion of said first spring biased member and including a secured circular gear adapted to engage and rotate said planar transfer gear;
 (f) a double-tiered gear rotatably mounted upon a portion of said second spring biased member, said double-tiered gear having first and second circular gears secured to each other in axial abuttment with one another, the first circular gear being adapted to engage said planar transfer gear; and
 (g) a magnetic tape head cleaning wheel rotatably coupled to a second portion of said second spring biased member substantially coplanar to said double-tiered gear, said magnetic tape head cleaning wheel including a first cleaning surface adapted to contact the magnetic tape head of the magnetic tape transport and means for coupling said magnetic tape head cleaning wheel to the second circular gear of said double-tiered gear whereby said magnetic tape head cleaning wheel is rotated upon the engagement of said input means to the capstan drive.

7. A magnetic tape head cleaning apparatus as defined in claim 6 including a first resilient member coupled to the lower wall of said housing and said first spring biased member and a second resilient member coupled to said first and second spring biased members.

8. A magnetic tape head cleaning apparatus as defined in claim 6 further including a capstan drive cleaning member disposed adjacent one of said apertures in the front wall of said housing comprising first and second sections on opposite sides of a shaft projecting upwardly from the lower wall of said housing, said capstan drive cleaning member being rotatably coupled about said shaft, a first surface of said first section adapted to contact the capstan roller, a cleaning surface disposed upon said second section, said cleaning surface being urged against the capstan drive when the first surface is in contact with the capstan roller, and resilient means for providing a spring biased force coupled to the first section whereby the first surface of the first section of the capstan drive cleaning member is urged against the capstan roller.

9. A magnetic tape head cleaning apparatus as defined in claim 6 further including a swingable pivot arm pivotally coupled to the lower wall of said housing, said pivot arm having a first surface projecting through an aperture in the front wall of said housing adapted to contact the capstan roller, and a second surface being adjacent said first spring biased member whereby contact between the capstan roller and the first surface pivots said pivot arm, the second surface thereof bearing against said first spring biased member causing said input means to frictionally engage the capstan drive.

* * * * *